Feb. 20, 1962 J. C. BONDURANT 3,021,717
UNIFORM SPEED CHANGER OR TRANSMISSION
Filed Dec. 20, 1960 2 Sheets-Sheet 1
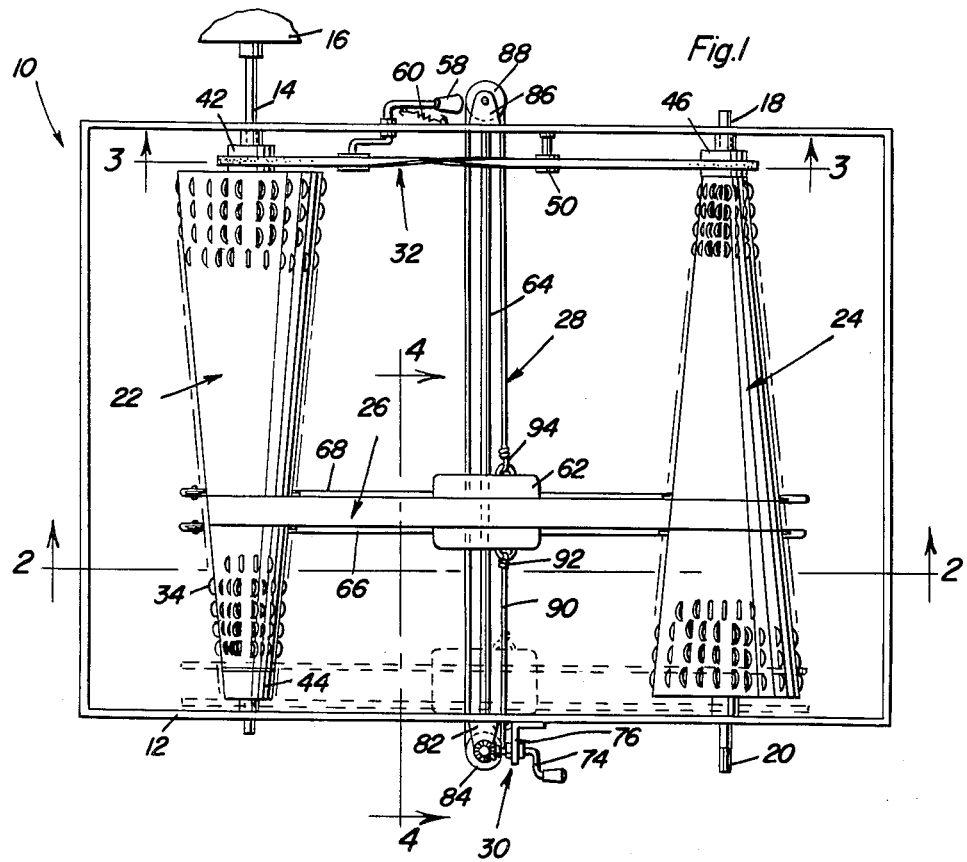
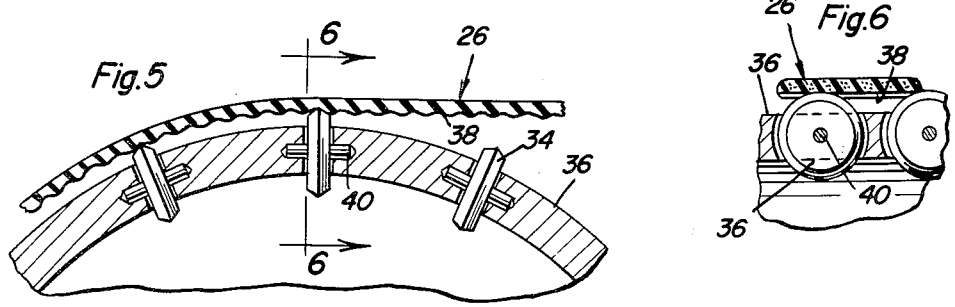
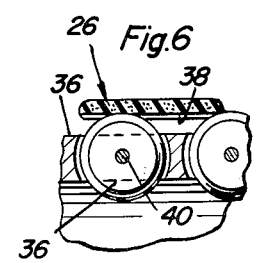
John C. Bondurant
INVENTOR.

Feb. 20, 1962 J. C. BONDURANT 3,021,717
UNIFORM SPEED CHANGER OR TRANSMISSION
Filed Dec. 20, 1960 2 Sheets-Sheet 2
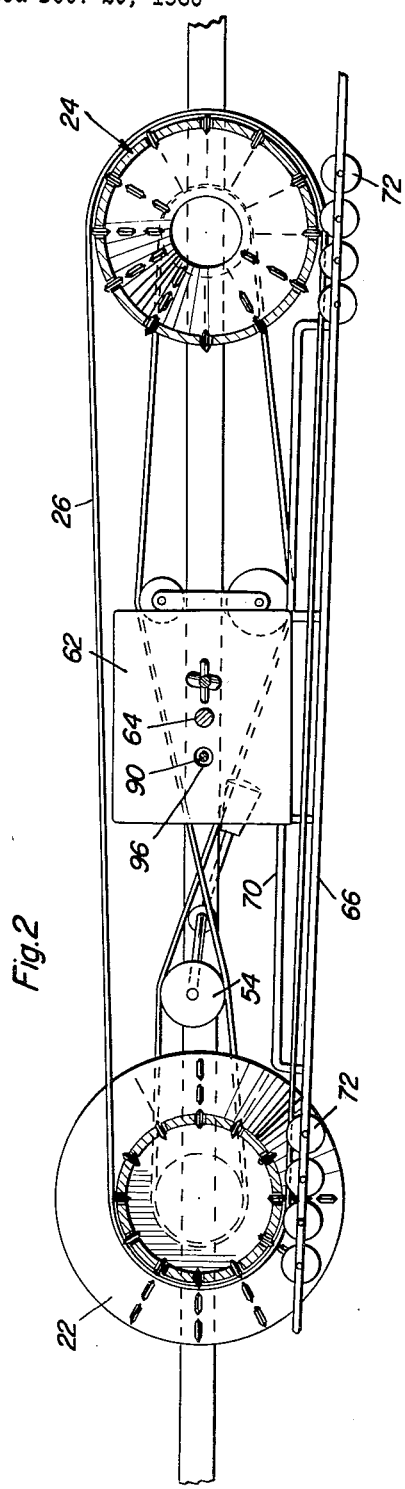
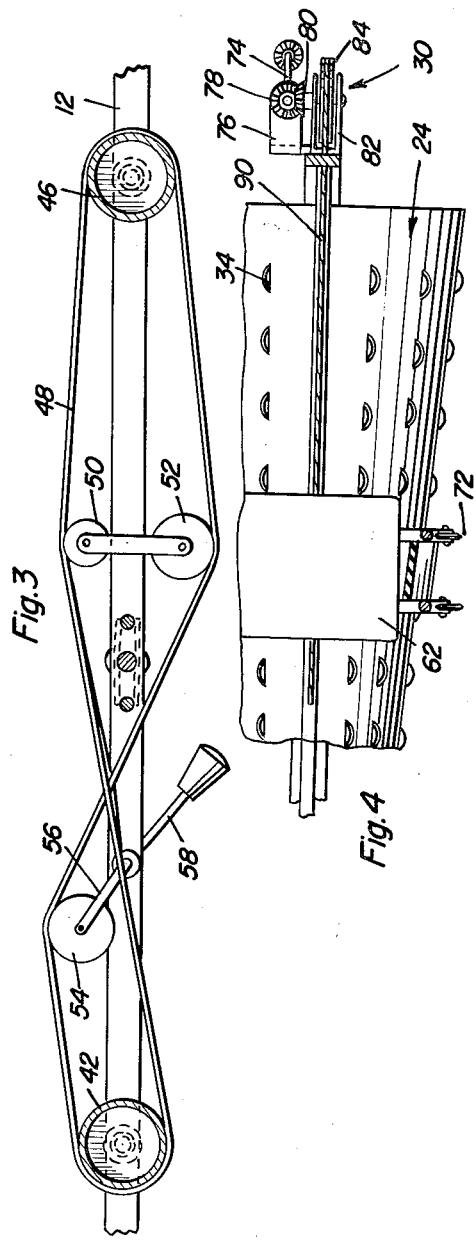
John C. Bondurant
INVENTOR.

United States Patent Office 3,021,717
Patented Feb. 20, 1962

3,021,717
UNIFORM SPEED CHANGER OR
TRANSMISSION
John C. Bondurant, 300 Moulton, Hickman, Ky.
Filed Dec. 20, 1960, Ser. No. 77,147
6 Claims. (Cl. 74—217)

This invention relates to an infinitely variable ratio drive mechanism of the endless friction belt type.

A primary object of this invention is to provide an infinitely variable ratio drive mechanism, the drive ratio of which may be easily and smoothly varied during power transmission.

Another object of this invention is to provide an infinitely variable power transmission device in which the ratio change may be effected in a more uniform and more effortless manner than was heretofore possible in comparable transmission devices.

A further object of this invention is to provide a variable ratio transmission of the endless friction belt type the ratio of which is infinitely variable with the ratio variation capable of being effected without wear or damage to the endless belt during power transmission.

An additional object of this invention is to provide an infinitely variable endless friction belt type of transmission wherein the endless belt is entrained about a pair of oppositely directed conical rollers so that ratio change may be effected by axial movement of the endless belt with respect to the conical rollers such ratio change being effected with a less complicated shifting mechanism in a smoother manner by virtue of the use of a plurality of guide rollers mounted on the conical rollers and having roller surfaces projecting therefrom for engagement with the endless belt, said guide rollers being rotatably mounted on axes disposed perpendicular to the rotational axes of the conical drive rollers. Accordingly, to shift the endless belt along the rotational axes of the conical drive rollers, no loosening of the belt need be resorted to in order to effect the axial shifting nor is it necessary to stop powered transmission during the ratio change. The guide rollers in the unique installation of the present invention accommodate axial shifting of the endless drive belt and yet effectively transmits thereto power in a direction perpendicular to the rotational axes of the conical drive rollers. The friction belt may therefore be engaged with a plurality of projecting roller surfaces on the conical drive rollers for transmission therebetween.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the transmission device of the present invention.

FIGURE 2 is a sectional view taken through a plane indicated by section line 2—2 in FIGURE 1.

FIGURE 3 is a sectional view taken through a plane indicated by section line 3—3 in FIGURE 1.

FIGURE 4 is a sectional view taken through a plane indicated by section line 4—4 in FIGURE 1.

FIGURE 5 is a partial sectional view through a conical drive roller and engaging drive belt to show the driving relationship therebetween.

FIGURE 6 is a sectional view taken through a plane indicated by section line 6—6 in FIGURE 5.

Referring now to the drawings in detail, the transmission device as seen in FIGURE 1 is generally referred to by reference numeral 10. Any suitable frame 12 for the transmission device 10 is provided for mounting and journaling the various parts thereof. It will therefore be observed that the transmission frame 12 rotatably mounts adjacent one side thereof the input shaft 14 to which any suitable power source 16 may be connected. Also mounted by the frame 12 adjacent the opposite end thereof in parallel spaced relationship to the input shaft 14, is an output shaft 18 having an output end 20 to which any suitable driven mechanism may be connected. A conical drive roller generally referred to by reference numeral 22 is rotationally fixed to the input shaft 14 while an oppositely directed conical roller 24 is rotationally fixed to the output shaft 18. The conical drive rollers 22 and 24 are drivingly interconnected by an endless drive belt mechanism 26. A belt shifting mechanism generally referred to by reference numeral 28 is also mounted by the frame 12 for the purpose of shifting the drive belt mechanism 26 in a direction parallel to the axes of the input shaft 14 and output shaft 18. Belt shifting actuator mechanism generally referred to by reference numeral 30 is accordingly provided and is operatively connected to the shifting mechanism 28 for infinitely varying the drive ratio of the transmission 10. Also provided in the transmission 10 is a reverse drive mechanism generally referred to by reference numeral 32.

Referring now to the construction of the conical drive rollers 22 and 24 which are of similar construction, it will be observed that the conical drive rollers rotatably mount a plurality of guide rollers 34 which are closely spaced to each other for rotation about axes disposed perpendicular to the rotational axis of the conical drive roller. As more clearly seen in FIGURES 5 and 6, the endless belt mechanism 26 does not directly frictionally engage the outer surface 36 of the conical drive roller but instead engages the projecting surface on the guide rollers 34 which come in contact with the undersurface 38 of the endless belt 26. The undersurface 38 is accordingly suitably roughened for drive engagement with the rollers 34. It will be noted therefore that the rollers 34 are rotatably mounted by pin axles 40 which by virtue of their disposition perpendicular to the rotational axis of the conical drive roller will transmit power between the conical drive roller and belt 26 in a direction perpendicular to the rotational axis of the conical drive roller in order to impart linear movement to the belt 26. On the other hand, shifting of the belt 26 parallel to the rotational axis of the drive roller will be accommodated by the rollers 34 inasmuch as the rollers 34 will rotate about axes perpendicular to the shifting ratio changing movement of the belt 26. It will also be observed that the rollers engage the belt 26 along the width thereof so that a relatively thin belt may be utilized.

The conical drive roller 22 has connected thereto at one end a uniform diameter reverse drive portion 42 while adjacent to the smaller diameter end of the conical drive roller 22 an idle roller member 44 is loosely mounted on the input shaft 14. The driven conical roller 24 on the other hand, includes a uniform diameter portion 46 at the smaller diameter end of the roller 24 which is drivingly connected to the portion 42 on the input roller 22 when the reverse drive mechanism 32 is rendered effective.

Referring therefore to FIGURES 1 and 3, it will be observed that the reverse drive mechanism 32 includes a cross endless belt member 48 entrained about the roller portions 42 and 46. Interconnected with the frame 12 and engaging the cross belt member 48 are idler rollers 50 and 52 provided for the purpose of maintaining the belt member 48 clear of the ratio change shifting mechanism 28. Ordinarily, the endless drive belt member 48 is in a slack and hence inoperative condition. In order to render the reverse drive belt member 48 effective, a belt tightening roller 54 is provided and rotatably mounted at the end of a lever member 56 connected to a reverse drive control lever 58 and rotatably mounted in the frame 12. Accordingly, by actuating the reverse control lever 58 in a clockwise direction as viewed in FIGURE 3 against the bias of spring 60 as seen in FIGURE 1, the belt tightening roller 54 will engage the belt member 48 to render it effective in order to transmit movement between the input shaft 14 and output shaft 18 in opposite directions for reverse drive purposes. However, in order to effect the aforementioned reverse drive, it will be necessary to position the infinitely variable drive belt mechanism 26 in an idle position as shown by dotted line in FIGURE 1, in which case the belt 26 engages the idle roller member 44 at the smaller diameter end of the conical drive roller 22.

For forward drive of the transmission device 10, the belt mechanism 26 transmits movement between the input roller 22 and the output roller 24 in the same direction. Infinite ratio variation between the speed of the input roller 22 and the output roller 24 may, however, be effected by virtue of the variable diameter of the conical drive rollers with which the belt mechanism 26 is engaged. Accordingly, the shifting mechanism 28 is provided for the purpose of shifting the belt mechanism 26 parallel to the rotational axes of the drive rollers 22 and 24 which shifting movement is accommodated by the guide rollers 34 as hereinbefore explained. Accordingly, no belt tightening or loosening mechanism is associated with the shifting mechanism 28 since the ratio change shifting of the belt mechanism 26 may be effected during power transmission. The shifting mechanism 28 therefore includes a slide block member 62 as seen in FIGURES 1, 2 and 4 which is slidably mounted on a cross rod member 64 connected to the frame 12. Connected to the bottom of the slide block member 62 are a pair of belt guide arms 66 and 68 between which the belt mechanism 26 is disposed at its lower run portion. As more clearly seen in FIGURE 2, guide rails 70 are connected to the arms 66 and 68 which arms extend beyond the conical drive rollers 22 and 24. Rotatably mounted by the arms 66 and 68 adjacent to the conical drive roller ends thereof are a plurality of guide rollers 72 rotatably mounted about axes parallel to the rotational axes of the conical drive rollers. The belt 26 is disposed between the sides of the rollers 72 so that the belt sides as they leave the conical drive rollers will engage the sides of the rollers 72 and will thereby be guidingly confined between the arms 66 and 68. It will therefore be appreciated, that in order to change the ratio it will only be necessary to shift the slide block 62 along its rod mounting 64.

The actuating mechanism 30 is therefore provided for the purpose of slidably shifting the slide block member 62 for the purpose hereinbefore explained. The actuating mechanism 30 therefore includes an actuating crank member 74 which is rotatably mounted by a bracket member 76 fixed to the frame 12. Connected to one end of the crank shaft member 74 is a bevel gear 78 which meshes with a bevel gear 80 rotatably mounted above a bifurcated bracket member 82 connected to the frame 12. The bevel gear member 80 in turn is connected to a pulley wheel 84 rotatably mounted between the bifurcations of the member 82. A similar bracket member 86 rotatably mounting pulley wheel 88 is connected to the frame 12 at the side thereof opposite the bracket member 82 in line with the guide rod member 64. A cable member 90 is trained about the pulley members 84 and 88 with one end 92 being connected to the slide block member 62 while the other end 94 is also connected to the slide block member 62 on the opposite side thereof. The cable 90 therefore extends through an aperture 96 provided in the slide block member 62 for such purpose. It will therefore be apparent that upon rotation of the crank member 74 the pulley member 84 may be rotated to cause linear movement of the cable member 90 and thereby cause the slide block member 62 to be shifted along the guide rod member 64. The ratio change as hereinbefore explained may thereby be effected.

From the foregoing, operation and utility of the transmission device of this invention will be apparent. It should be understood, however, that the essential ingredient rendering the transmission device of this invention advantageous over previous comparable infinitely variable ratio transmission devices is the provision of the uniquely arranged guide rollers on the conical drive rollers for engagement with the endless drive belt so as to accommodate drive ratio shifting of the belt during powered rotation of the conical drive rollers and power transmission through the drive belt. The more effective mounting mechanism and shifting mechanism for the drive belt 26 is thereby made possible. Although one particular form of drive belt shift actuating mechanism 30 has been described, it should be appreciated that other equivalent forms may be utilized. Also, it will be appreciated that automatically controlled actuating mechanisms may be resorted to which respond either to the input speed or output speed of the transmission device or to other ratio changing signals that may be desired. It will also be appreciated by those skilled in the art, that the infinitely variable transmission device of the present invention is especially advantageous because of the use axially fixed conical drive rollers with which the shiftable endless drive belt is associated and wherein the mounting of the guide rollers 34 thereon has rendered the heretofore difficult ratio change shifting unexpectedly uniform, simple and more effective.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An infinitely variable ratio drive transmission comprising variable diameter drive means, means rotatably mounting said drive means in axially fixed relation to a rotational axis, driven transmitting means drivingly engageable with said variable diameter drive means and movable parallel to said rotational axis for varying the drive ratio between the drive means and transmitting means, guide means operatively mounted on the drive means for engagement by the transmitting means to restrict relative movement between the drive means and transmitting means in all directions except directions parallel to the rotational axis and means drivingly independent of the drive means for shifting the transmitting means in a direction parallel to said rotational axis to infinitely vary the drive ratio between the drive means and the transmitting means during power transmission, said guide means comprising a plurality of closely spaced externally projecting guide rollers rotatably mounted by the drive means about axes disposed perpendicular to said rotational axis.

2. The combination of claim 2, wherein said transmitting means comprises an endless friction belt means having a surface engageable with said guide means for transmission of movement between the drive means and belt means in a direction perpendicular to the rotational axis.

3. The combination of claim 2, wherein said drive means comprises a pair of oppositely directed conical rollers rotatably mounted in parallel spaced relation to each other and said transmitting means extends therebetween.

4. The combination of claim 3 wherein said shifting means comprises slide means slidably mounted parallel to the rotational axis, guide arm means connected to the slide means for guiding movement of the transmitting means perpendicular to the rotational axis and actuating means for imparting ratio change shifting movement to the slide means.

5. The combination of claim 4, including reverse drive mechanism drivingly interconnecting the conical drive rollers for rotation in opposite directions when the belt means is rendered ineffective to transmit rotation to or from one of the conical rollers.

6. An infinitely variable ratio drive transmission comprising variable diameter drive means, means rotatably mounting said drive means in axially fixed relation to a rotational axis, driven transmitting means drivingly engageable with said variable diameter drive means and movable parallel to said rotational axis for varying the drive ratio between the drive means and transmitting means, guide means operatively mounted on the drive means for engagement by the transmitting means to restrict relative movement between the drive means and transmitting means in all directions except directions parallel to the rotational axis and shifting means drivingly independent of the drive means for shifting the transmitting means in a direction parallel to said rotational axis to infinitely vary the drive ratio between the drive means and the transmitting means during power transmission, said drive means comprising a pair of oppositely directed conical rollers rotatably mounted in parallel spaced relation to each other, said transmitting means extending therebetween, said guide means comprising a plurality of closely spaced externally projecting guide rollers rotatably mounted by the drive means about axes disposed perpendicular to said rotational axis.

References Cited in the file of this patent
UNITED STATES PATENTS 2,705,892      Yeager _____ Apr. 12, 1955